United States Patent Office 3,557,134
Patented Jan. 19, 1971

3,557,134
5,6-DIHYDRO-5,6-SUBSTITUTED-3H-IMIDAZO-
(2,1-c)-1,2,4-DITHIAZOLE-3-THIONES
Gerald T. Stowe, Oakland, Calif., assignor to The Dow
Chemical Company, Midland, Mich., a corporation of
Delaware
No Drawing. Filed Dec. 30, 1968, Ser. No. 788,045
Int. Cl. C07d 99/10
U.S. Cl. 260—306.8            6 Claims

ABSTRACT OF THE DISCLOSURE

Novel 5,6-dihydro-3H-imidazo(2,1-c)-1,2,4-dithiazole-3-thiones are disclosed which are substituted in the 6-position or in both the 5- and the 6-positions by alkyl or phenyl groups. The compounds have utility as active constituents of various fungicidal and other pesticidal compositions.

SUMMARY OF THE INVENTION

The novel compounds of the present invention are those of the formula

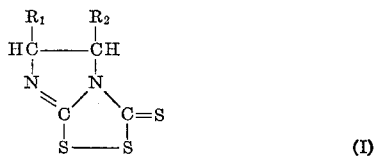

(I)

wherein $R_1$, which is attached to the carbon atom occupying the 6-position of the dihydroimidazole ring, is an alkyl or phenyl group, and wherein $R_2$, which is attached to the carbon atom in the 5-position of the dihydroimidazole ring, is an alkyl group or hydrogen. As employed herein, "alkyl" designates an alkyl group containing 1, 2, 3 etc. and to and including 6 carbon atoms, and from 1 to 2, to 3 etc. and up to and including 6 carbon atoms such as methyl, ethyl, propyl, butyl, pentyl or hexyl. For convenience of description, the compounds coming within the scope of the above formula are referred to in the specification and claims as "substituted imidazo-dithiazole" compounds or simply as "imidazo-dithiazole" compounds.

The novel compounds of this invention are yellow crystalline solids which are substantially insoluble in water and possess moderate to good solubility in organic solvents such as ethanol, benzene, acetone, cyclohexane and chloroform. Said novel compounds have utility in pesticidal applications, and can be employed in the control of various fungal, bacterial and insect pests.

Representative novel compounds coming within the scope of the present invention include the following:

5,6-dihydro-6-methyl-3H-imidazo(2,1-c)1,2,4-dithiazole-3-thione
5,6-dihydro-6-ethyl-3H-imidazo(2,1-c)-1,2,4-dithiazole-3-thione
5,6-dihydro-6-n-hexyl-3H-imidazo(2,1-c)-1,2,4-dithiazole-3-thione
5,6-dihydro-6-phenyl-3H-imidazo(2,1-c)-1,2,4-dithiazole-3-thione
5,6-dihydro-5,6-dimethyl-3H-imidazo(2,1-c)-1,2,4-dithiazole-3-thione
5,6-dihydro-5,6-diethyl-3H-imidazo(2,1-c)-1,2,4-dithiazole-3-thione
5,6-dihydro-5-methyl-6-ethyl-3H-imidazo(2,1-c)-1,2,4-dithiazole-3-thione The substituted imidazo-dithiazole compounds of the present invention can be prepared by the oxidation of the alkali metal or ammonium salt of the corresponding appropriately substituted α,β-alkylenebisdithiocarbamate. Useful oxidizing agents for this purpose include alkali metal or ammonium persulfates which are soluble in an alkaline aqueous reaction medium or a solution of bromine in chloroform or other appropriate solvent as employed in an aqueous alcoholic reaction medium. The oxidation can be carried out using the preformed, water-soluble α,β-alklyenebisdithiocarbamate salt or a product mixture obtained as the said salt is formed by the reaction of carbon disulfide with the appropriate a,β-alkylene-diamine. The latter reaction is described in U.S. Pats. Nos. 2,317,765 and 2,609,389, and is typified by reactions wherein carbon disulfide, in the presence of alkali metal hydroxide, or ammonium hydroxide is reacted with 1,2-propanediamine, for example, to produce a 1,2-propylene-bisdithiocarbamate salt, with 2,3-butanediamine to produce a 2,3-butylenebisdithiocarbamate salt or with phenyl-ethylenediamine to produce a phenylethylenebisdithiocarbamate salt. The foregoing reactions with carbon disulfide are carried out in an inert solvent for the diamine such as water, methanol, ethanol or isopropanol and proceed readily at temperatures of about 25° C. to 60° C. The solution of the α,β-alkylenebisdithiocarbamate salt so formed can either be employed directly in the oxidative process for obtaining the compounds of the present invention, or the salt can first be recovered from the solution (as by evaporating off the solvent, for example) and then oxidized to the product compounds hereof in a separate step. These α,β-alkylenebisdithiocarbamate starting compounds have the formula

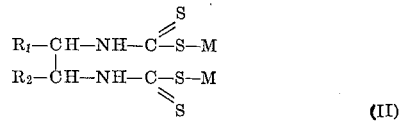

(II)

wherein $R_1$ and $R_2$ have the same meaning as recited above, and wherein M represents sodium, potassium or other alkali metal, or ammonium.

When a persulfate is employed to oxidize the alkylene-bisdithiocarbamate salt compounds of Formula II to the corresponding imidazo-dithiazole compounds of the present invention, the reactants are brought together in any order, with stirring, in an alkaline aqueous reaction medium wherein the pH is maintained at a level of from about 10 to 12 during the oxidation reaction by the addition of caustic. Preferably, however, the persulfate is slowly added to the stirred solution of the carbamate salt, with caustic being added as required, and with the temperature of the reaction mixture being maintained below about 35° C. The reactants are employed in a ratio of at least 2 moles of the persulfate for each mole of the alkylenebisdithiocarbamate salt, if maximum yields are to be obtained. However, the use of the reactants in this particular proportion is not necessary inasmuch as some of the desired product will be formed on combining the reactants in other proportions as well. The use of excess persulfate reactant is preferred, and good results have been obtained using 3 or more moles of this reactant per mole of the carbamate reactant. While the reaction temperature is not critical, it is preferred that the solution be maintained at a level below about 35° C. as the oxidation takes place. The reaction is exothermic, and ice is preferably added to the solution as required to control the temperature at the desired level. The imidazodithiazole compounds formed precipitate out from the solution as the reaction progresses along with a certain amount of elemental sulfur. The oxidation reaction is relatively rapid and in typical instances is complete as soon as all the persulfate has been added and stirred into the reaction mixture. The product imidazo-dithiazole compound can be recovered from the product mixture by the practice of conventional recovery and purification procedures known to the skilled in the art. A preferred method is to extract the compound from the reaction mixture with chloroform and then treat the extract with hydrogen bromide to form a salt of the imidazo-dithiazole compound which precipitates from the solution, thus separating the product from the sulfur formed during the reaction which remains in solution in the chloroform. This precipitate is recovered by filtration and is then neutralized with cold sodium carbonate solution. The resulting free imidazodithiazole compound can then be taken up in benzene or other appropriate solvent and recrystallized therefrom. In another procedure, the crude product obtained by extracting the reaction mixture with chloroform and then evaporating the extract to dryness is purified by chromatography on a column of silica gel eluting with benzene, the final product being recrystallized from a solvent such as benzene, ethanol or cyclohexane, for example.

When bromine is used to oxidize the $\alpha,\beta$-alkylene-bisdithiocarbamate salts to the corresponding imidazo-dithiazole compounds hereof, the preferred procedure is to dissolve the salt in an ethanol-water solvent and then slowly add a solution of the bromine in a solvent such as ethanol, carbon tetrachloride, carbon disulfide, diethyl ether or chloroform to the stirred reaction mixture under ambient temperature conditions until the bromine color persists. The desired imidazodithiazole compound precipitates from the reaction mixture in the form of its hydrobromide salt which can then be collected by filtration, washed with chloroform, for example, neutralized with cold sodium carbonate solution, and finally recrystallized from benzene or other appropriate solvent, if desired.

The novel compounds of this invention can be identified and their structure confirmed by various methods including elemental analysis and nuclear magnetic resonance, infrared and mass spectra methods of analysis. It is to be noted that the infrared spectra of all the imidazodithiazole compounds hereof exhibit a strong band in the 1,500 to 1,630 cm$^{-1}$ region, thus indicating the presence of C=N— grouping. They are free of any band in the 3,200 cm.$^{-1}$ region, thus indicating the absence of the —NH— grouping.

DESCRIPTION OF THE PREFERRED EMBODIMENTS

The following examples are merely illustrative of the invention and are not to be construed as limiting.

EXAMPLE 1

5,6-dihydro-6-methyl-3H-imidazo(2,1-c)-1,2,4-dithiazole-3-thione

To a stirred solution of 45 g. (1.1 mole) of sodium hydroxide and 84 g. (1.1 mole) of carbon disulfied in 750 ml. of water is slowly added 34 g. (0.5 mole) of 1,2-propanediamine in 450 ml. of water, the addition taking approximately 1 hour. This solution is heated, with stirring, to a temperature of about 50°–60° C. for 5 hours and then cooled to room temperature. Oxidation of the disodium-1,2-propylenebisdithiocarbamate salt thus formed is then effected by gradually adding 228 g. (1.0 mole) of ammonium persulfate to the solution over the course of approximately ½ hour. During the ensuing oxidation step, the solution is stirred and maintained at a pH between 10 and 12 by the addition of aqueous sodium hydroxide, the temperature of the solution being kept below 35° C. by the addition of ice as required. A yellow solid precipitates during the oxidation step which is judged to be complete as soon as all the persulfate has been added. This precipitate is a mixture of sulfur and the captioned product compound. This reaction product mixture is then extracted with chloroform. The extract is recovered and reacted with hydrogen bromide, thereby precipitating out a yellow solid representing the hydrobromide salt of the said product compound. This precipitate is filtered off, washed with chloroform, and then neutralized with a cold aqueous solution of sodium carbonate. The product compound, present as a solid, is then filtered off, taken up in benezene and recrystallized therefrom to provide 43 grams of a yellow crystalline product having a melting point of 153°–154° C. which is substantially insoluble in water and of moderate to good solubility in acetone, cyclohexane, chloroform and benzene. This product is identified by infrared, nuclear magnetic resonance and mass spectra as 5,6-dihydro-6-methyl-3H-imidazo(2,1-c)-1,2,4-dithiazole-3-thione. This identity of the compound is confirmed by elemental analysis which discloses the compound to have carbon, hydrogen and nitrogen contents of 31.6, 2.9 and 15.0 percent, respectively, versus theoretical values of 31.6, 3.2 and 14.7, respectively, for these same elements.

EXAMPLE 2

5,6-dihydro-6-methyl-3H-imidazo(2,1-c)-1,2,4-dithiazole-3-thione

A solution of 9 g. (0.03 mole) of the dihydrated disodium salt of 1,2-propylenebisdithiocarbamic acid in 50 ml. of water and 20 ml. of ethanol is oxidized at ambient temperatures by the dropwise addition, with stirring, of a 50 percent by volume solution of bromine in chloroform. The addition of bromine is continued until the bromine color persists. The desired product compound, which is present as a precipitate in the reaction product mixture in the form of its hydrobromide salt, is filtered off, washed with chloroform and then neutralized with cold sodium carbonate solution. There is recovered from the resulting mixture 1 g. of a yellow solid compound which is identical in all respects with the compound prepared in Example 1.

EXAMPLE 3

5,6-dihydro-5,6-dimethyl-3H-(2,1-c)-1,2,4-dithiazole-3-thione

In substantially the same manner as described in Example 1, sodium hydroxide (0.35 mole), carbon disulfide (0.35 mole) and 2,3-butanediamine (0.1 mole) are brought together in 200 ml. of water and the solution is refluxed for a period of 2 hours. The resulting solution of disodium-2,3-butylenebisdithiocarbamate, as diluted with 1 liter of water is reacted with ammonium persulfate (0.32 mole) added incrementally over the course of approximately ½ hour, the pH of the solution being maintained between 10 and 12 by the addition of caustic and the temperature being moderated by addition of ice as the oxidation reaction proceeds. The solution is then extracted with chloroform and the extract is recovered and evaporated to dryness, yielding a crude, yellow orange product. This product is purified by column chromatography on a column of silica gel eluting with benzene. On recrystallizing the resulting product from cyclochexane there is obtained 2.5 grams of a yellow crystalline compound having a melting point of 145°–149° C. which is substantially insoluble in water and of good solubility in acetone and benzene. This compound is identified by infrared, nuclear magnetic resonance and mass spectra analysis as 5,6 - dimethyl-3H-(2,1-c)-1,2,4-dithiazole-3-thione. This identity is confirmed by elemental analysis which discloses the compound to be one having carbon, hydrogen and nitrogen contents of 35.5, 3.9 and 13.7 percent, respectively, versus calculated values of 35.3, 4.0 and 13.7 percent, respectively, for these elements.

EXAMPLE 4

5,6-dihydro-6-n-hexyl-3H-imidazo(2,1-c)-1,2,4-dithiazole-3-thione

To a solution of 16 g. (0.21 mole) of carbon disulfide in 100 ml. of tetrahydrofuran is added dropwise a mixture of 13.1 g. (0.09 mole) of 1,2-octanediamine and 8.4 g. (0.21 mole) of sodium hydroxide in 150 ml. of water. The solution is stirred for 2 hours, after which the tetrahydrofuran is removed under vacuum leaving an aqueous solution of disodium - 1,2 - octylenebisdithiocarbamate.

Following the general procedure of Example 3, this solution is diluted to 1 liter with water and then oxidized with 45.6 g. (0.2 mole) of ammonium persulfate in 200 ml. of water. The product recovery and purification steps also follow those of Example 3. There is recovered 6.5 g. of a yellow crystalline product compound having a melting point of 53°–55° C. which is substantially insoluble in water and of good solubility in acetone and benzene. This compound is identified by infrared, nuclear magnetic resonance and mass spectra analysis as 5,6-dihydro-6-n-hexyl-3H-imidazo(2,1 - c)-1,2,4-dithiazole-3-thione. This identity is confirmed by elemental analysis which discloses the compound to be one having carbon, hydrogen and hydrogen contents of 46.0, 6.1 and 11.0 percent, respectively, versus calculated values of 46.1, 6.2 and 10.8 percent, respectively, for these elements.

EXAMPLE 5

5,6-dihydro-6-phenyl-3H-imidazo(2,1-c)-1,2,4-dithiazole-3-thione

In substantially the same method as described in Example 4, carbon disulfide (0.21 mole), phenylethylenediamine (0.1 mole) and sodium hydroxide (0.21 mole) are reacted together in an aqueous tetrahydrofuran solution and the resulting disodium phenylethylenebisdithiocarbamate is oxidized in aqueous solution with ammonium persulfate (0.2 mole). The product, as purified by column chromatography and recrystallized from cyclohexane, is recovered in the amount of 5.1 g. as a yellow crystalline solid melting at 112°–113° C. which is substantially insoluble in water and of good solubility in acetone and benzene. It is identified by infrared, nuclear magnetic resonance and mass spectra analysis as 5,6-dihydro-6-phenyl-3H-imidazo(2,1 - c)-1,2,4-dithiazole-3-thione. This identity is confirmed by elemental analysis which discloses the compound to have carbon, hydrogen and nitrogen contents of 48.1, 3.3 and 11.0 percent, respectively, versus calculated values of 47.6, 3.2 and 11.1 percent, respectively, for these elements.

EXAMPLE 6

5,6-dihydro-6-ethyl-3H-imidazo(2,1-c)-1,2,4-dithiazole-3-thione

In substantially the same method as described in Example 3, and following the product recovery and purification procedures there described, 5,6-dihydro-6-ethyl-3H-imidazo(2,1-c)-1,2,4-dithiazole-3-thione is obtained in the amount of 10.8 grams as a yellow crystalline solid melting from 97.5° to 100° C., by the reaction of carbon disulfide (0.25 mole), 1,2-butanediamine (0.11 mole) and sodium hydroxide (0.25 mole), followed by oxidation of the resulting intermediate with ammonium persulfate (0.23 mole), the temperature in the oxidation step being maintained below 15° C. This compound, which is identified by infrared, nuclear magnetic resonance and mass spectra analysis, is substantially insoluble in water and of good solubility in acetone, benzene and ethanol. Elemental analysis discloses the compound to have carbon, hydrogen and nitrogen contents of 35.4, 3.9 and 13.9 percent, respectively, as versus calculated values of 35.3, 4.0 and 13.7 percent, respectively for these elements.

The substituted imidazo-dithiazole compounds of the present invention are useful as pesticides and have particular utility as fungicides, bacteriocides and insecticides and as agents for the control of mites, mosquitoes, worms and other pests. The compounds can be employed as pesticides by distributing the compound, in a pesticidally effective quantity and usually in the form of a composition containing adjuvants to aid in dispersing the same, so as to contact directly the organisms to be controlled or, alternatively, so as to contact the growth medium or habitat of the organisms whereby eventual contact with said organisms will be established. For the control of bacterial and fungal pests, the active chemicals are applied in the form of compositions containing from about 10 to 500 or more parts of the chemical per million parts by weight of the composition. In the control of other pests, a pesticidal amount which is also a miticidal or an insecticidal amount is used.

For such bacteriocidal, fungicidal and other pesticidal applications, the active compounds hereof can be employed in unmodified form or in the form of a liquid or finely divided solid composition. Thus, the compounds can be dispersed in a finely divided solid and employed as dusts. The compounds and such solid dispersions can also be dispersed in water with or without the aid of a surface active agent and the resulting aqueous suspensions be employed as drenches, or sprays for application to plants, soil or otherwise. In other procedures, the compounds are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

In representative operations, aqueous suspensions containing 150 parts of one of each of the active chemicals indicated in the following table per million parts by weight of the ultimate compositions are sprayed into tomato seedlings which are then inoculated with the late blight organism *Phytophthora infestans*, allowed to grow for several days in a high humidity room and finally graded. The percent disease control effected by each chemical is given below in the table. In another representative operation, the same 150 p.p.m. aqueous suspensions of active chemical are sprayed onto young grape leaves which are then inoculated with the downy mildew organisms *Plasmorphora viticola* and similarly allowed to grow before being graded. The percent disease control here effected by each chemical is also given in the following table:

| | Percent disease control [1] | |
|---|---|---|
| | Late blight | Downey mildew |
| Active chemical | | |
| I. 5,6-dihydro-6-methyl-3-H-imidzao(2,1-c)-1,2,4-dithiazole-3-thione | 99 | 100 |
| II. 5,6-dihydro-5,6-dimethyl-3H-imidazo(2,1-c)-1,2,4-dithiazole-3-thione | 97 | 100 |
| III. 5,6-dihydro-6-n-hexyl-3H-imidazo(2,1-c)-1,2-4-dithiazole-3-thione | 67 | 99 |
| IV. 5,6-dihydro-6-phenyl-3H-imidazo(2,1-c)-1,2,4-dithiazole-3-thione | 50 | |
| V. 5,6-dihydro-6-ethyl-3H-imidazo-(2,1-c)-1,2,4-dithiazole-3-thione | 99 | 100 |

[1] Effected at 150 p.p.m. concentration of active chemical.

The compound 5,6-dihydro-6-methyl-3H-imidazo-(2,1-c)-1,2,4-dithiazole-3-thione, at a dosage rate of 500 p.p.m. is found to give complete kill of the organisms *Staphylococcus aureus, Candida albicans, Aspergillus tereus, Salmonella typhosa* and bacterium, acid fast; at a concentration of 100 p.p.m. it gives complete kill of *Bacillus subtilis, Pullularia pullulans* and *Rhizopus nigricans*, and at 10 p.p.m. complete kill of *Trichophyton mentagrophytes* and *Candida pelliculosa*. Similarly, the compound 5,6 - dihydro - 5,6 - dimethyl - 3H - imidazo(2,1 - c)-1,2,4-dithiazole-3-thione at a concentration of 500 p.p.m. gives complete kill of all these organisms.

At a concentration of 500 p.p.m., the compound 5,6-dihydro - 6 - methyl - imidazo(2,1-c) - 1,2,4 - dithiazole-3-thione gives 60 percent control of the southern army worm and of the two-spotted spider mite, and at a concentration of 400 p.p.m. it provides 75 percent control of the fungal organism responsible for rice blast disease. The compound 5,6-dihydro-5,6-dimethyl-3H-imidazo (2,1-c)-1,2,4-dithiazole-4-thione at a concentration of 500 p.p.m. gives 100 percent control of the southern army worm and the two-spotted spider mite, and at a concentration of 5 p.p.m. it gives 98 percent control of the yellow fever mosquito.

The alpha, beta-diamino compounds which can be employed as starting materials in preparing the α, β alkylene-bisdithiocarbamate precursor compounds are prepared by methods known to the skilled in the art. Thus, 1,2-diaminopropane can be prepared by the reaction of propylene dibromide and alcoholic ammonia at 100° C. Phenylethylenediamine, 1,2-diaminobutane and 1,2-diaminooctane can be synthesized from styrene, 1-butene and 1-octene, respectively, by first preparing their aziridines and then opening the ring with ammonia to give the corresponding diamine. 2,3-diaminobutane can be prepared by reducing dimethylglyoxime with sodium in ethanol. Methods utilizing the aziridine route are described by Hassner, Lorber and Heathcock, J. Org. Chem. 32, 540 (1967); Foglia and Swern, J. Org. Chem., 31, 3625 (1966) and 32, 75 (1967); and Clapp, JACS, 70, 184 (1948). The glyoxime preparation is described by Balthus et al., JACS, 58, 1474 (1936).

I claim:
1. Substituted imidazo-dithiazole compounds corresponding to the formula

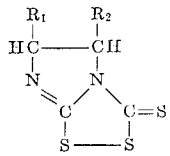

wherein $R_1$ represents a radical selected from the group consisting of phenyl and alkyl, and wherein $R_2$ represents a radical selected from the group consisting of hydrogen and alkyl, said alkyl groups being those having from 1 to 6 carbon atoms, inclusive.

2. The compound in accordance with claim 1 wherein $R_1$ is methyl and $R_2$ is hydrogen.

3. The compound in accordance with claim 1 wherein $R_1$ and $R_2$ each represent a methyl group.

4. The compound in accordance with claim 1 wherein $R_1$ is ethyl and $R_2$ is hydrogen.

5. The compound in accordance with claim 1 wherein $R_1$ is n-hexyl and $R_2$ is hydrogen.

6. The compound in accordance with claim 1 wherein $R_1$ is phenyl and $R_2$ is hydrogen.

References Cited

UNITED STATES PATENTS 3,389,137  6/1968  Mosby et al. _____ 260—306S

ALEX MAZEL, Primary Examiner

R. J. GALLAGHER, Assistant Examiner

U.S. Cl. X.R.

260—455; 424—270.